May 27, 1969        V. F. CLEEVES        3,446,425
MEANS AND METHOD FOR MINIMIZING BLEED AIR CONTAMINATION
Filed April 27, 1967        Sheet 1 of 3
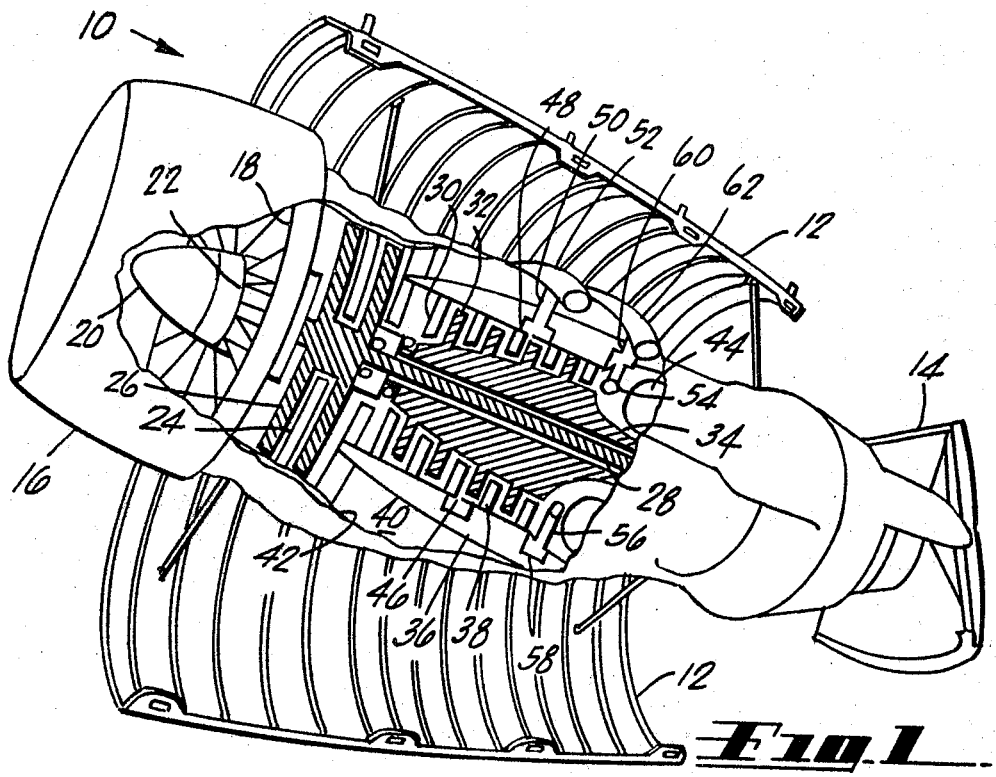
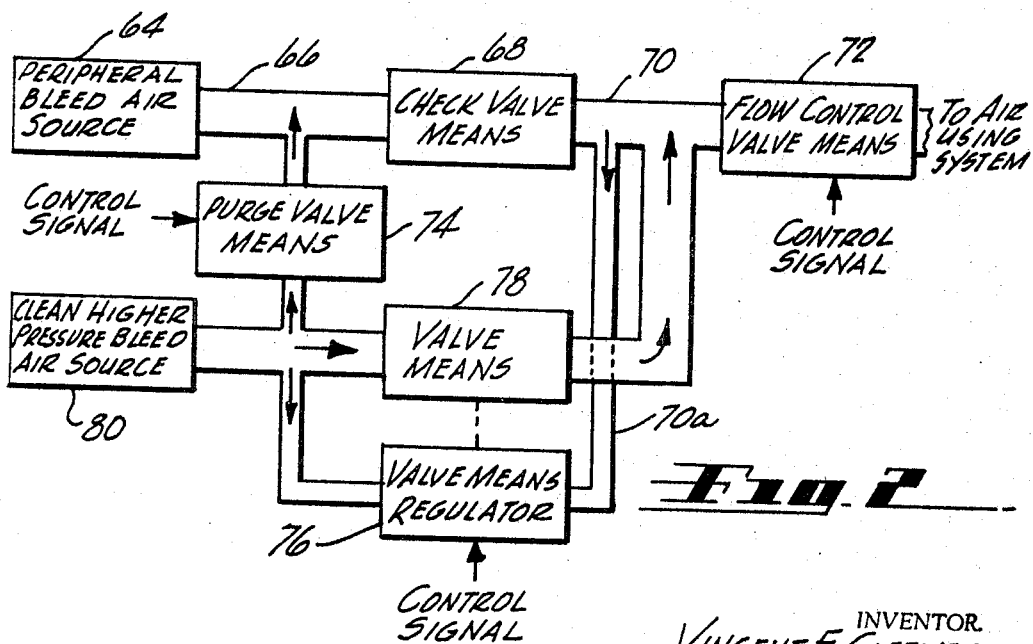
INVENTOR.
VINCENT F. CLEEVES
BY
—AGENT—

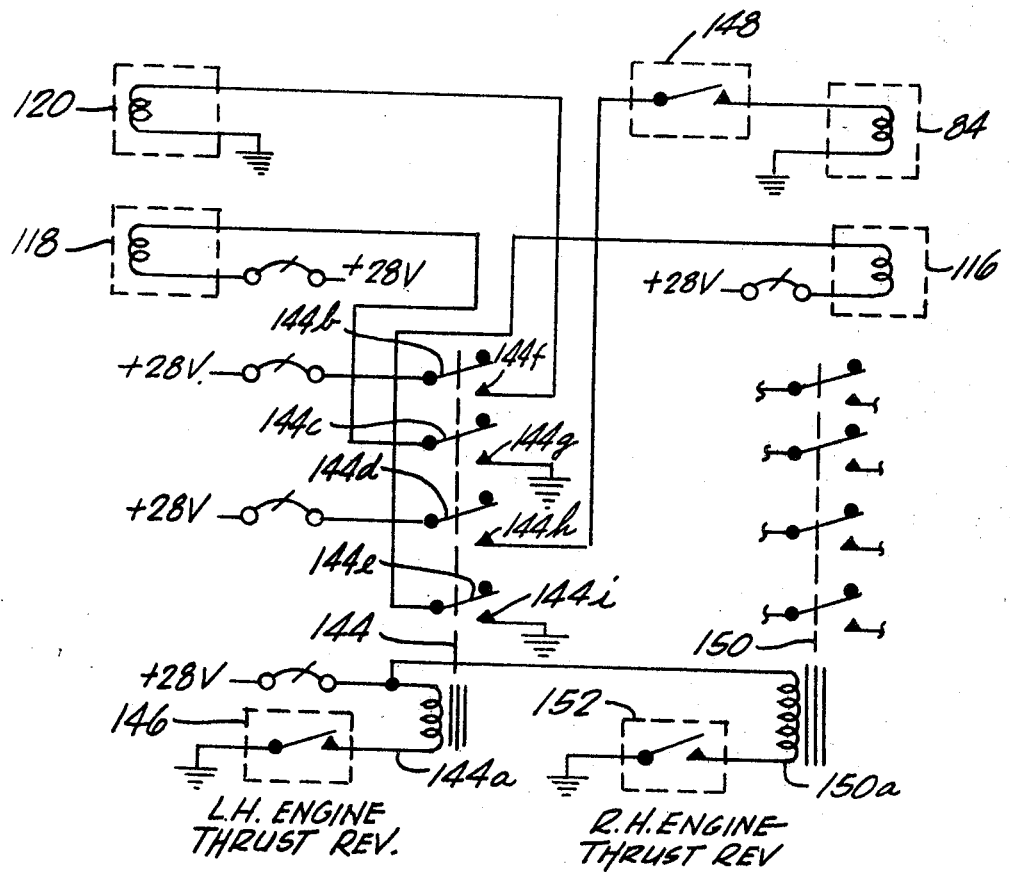
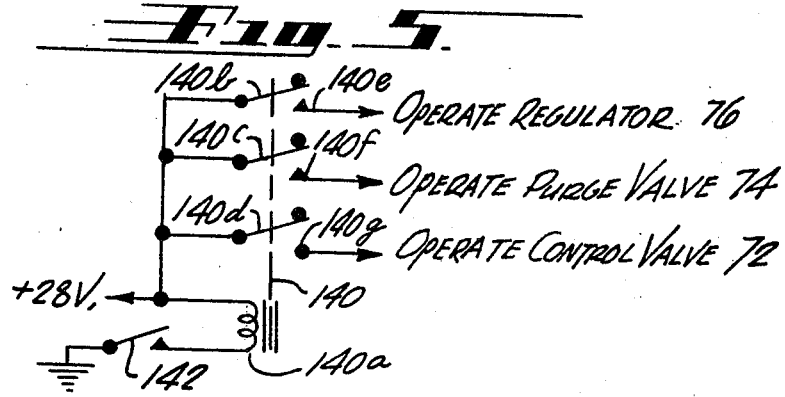

United States Patent Office 3,446,425
Patented May 27, 1969

3,446,425
MEANS AND METHOD FOR MINIMIZING BLEED AIR CONTAMINATION
Vincent F. Cleeves, Pacific Palisades, Calif., assignor, by mesne assignments, to McDonnell Douglas Corporation, a corporation of Maryland
Filed Apr. 27, 1967, Ser. No. 634,199
Int. Cl. F04d 27/00; F02k 3/00, 1/20
U.S. Cl. 230—114   6 Claims

ABSTRACT OF THE DISCLOSURE

Means for minimizing entry of contaminants such as dirt particles into system using bleed air from a lower stage peripheral port of a multiple stage rotary compressor, the means including a clean air connection from a higher pressure compressor stage, valve means operable to close off the air using system and connect the higher pressure connection to the bleed air output of the lower stage for preventing discharge of contaminated peripheral bleed air therefrom, and switch means controlling the valve means and operated during periods in which particularly large quantities of contaminants enter the compressor and are carried at such times by the peripheral bleed air.

Background of the invention

My invention pertains generally to the field of air supply and using systems. More particularly, the invention relates to a means and method for minimizing the inclusion of contaminants such as dirt particles in the bleed air that is obtained from a lower stage air bleed point of a multiple stage rotary compressor and supplied to associated air using systems, the compressor being subject to periods during which especially significant portions of contaminants enter the compressor.

Aerosols in the air entering a multiple stage rotary compressor are influenced by the rotating blades thereof and, as a result, receive a velocity component parallel to the plane of blade rotation. This velocity imparts a centrifugal force on the aerosol particles, causing them to move outwardly toward the compressor casing. After passing axially through a few stages of the compressor, most of the particles, which are usually contaminants such as dirt, that had entered the inlet of the compressor are concentrated in a thin layer traveling axially along the inner wall surface of the compressor casing. Upon reaching a lower stage bleed point, which consists of an opening or series of openings in the compressor casing, the air and contaminants leave the compressor together and subsequently enter ducting leading to the various air using systems.

At present, a filter of one sort or another is placed in the bleed air ducting to filter out the contaminants from the bleed air. The filter is, however, relatively large normally and usually space limitations about the compressor are such that the filter must be located remotely from the compressor. A typical filter is, for example, approximately 8 inches in diameter and about 2 feet long. As a result, it is frequently impractical to provide filtered air from the compressor to certain air using systems located closely adjacent to the compressor. Thus, the air using systems located in proximity to the compressor are often supplied with air of inadequate cleanliness, which causes eventual malfunctioning of such systems and consequential damage thereto.

In order to withstand the pressures and temperatures produced by the compressor, the bleed air filter must be quite rugged and this means a high weight penalty in addition to a large space factor. Also associated with the insertion of a filter in the bleed air ducting is the significant pressure loss incurred to force the air through the filter. It may further be necessary to have the filter serviced at regular intervals to maintain its effectiveness. It is particularly important to alleviate these burdens in the case of a compressor which is that of a turbofan or turbojet aircraft propulsion engine.

Summary of the invention

Briefly, and in general terms, my invention broadly includes a method of minimizing the entry of contaminants into a system using bleed air from a multiple stage compressor having a lower stage source of peripheral bleed air, the method comprising the steps of closing off the air using system and connecting a source of clean air at a pressure higher than the lower stage source to the bleed air output thereof to prevent the discharge of peripheral bleed air therefrom, these steps being taken only during periods wherein particularly large portions of contaminants enter the compressor and are carried at such times by the peripheral bleed air. By preventing flow of the highly contaminated peripheral bleed air from the lower stage source during these critical periods, the entry of contaminants into the associated air using system is greatly reduced and minimized.

The foregoing method is accomplished, for example, by providing a clean air connection from a compressor stage of higher pressure than the lower stage source of peripheral bleed air, valve means operable to close off the air using system and connect the higher pressure, clean air connection to the bleed air output of the lower stage source, and switch means controlling the valve means and operated only during certain periods when particularly large portions of contaminants enter the compressor and are carried at such times by the peripheral bleed air whereby the higher pressure, clean air provided into the bleed air output prevents the flow of the then highly contaminated peripheral bleed air into the associated air using system during these critical periods.

Brief description of the drawings

My invention will be more fully understood, and other features and advantages thereof will become apparent, from the following description of an illustrative embodiment of the invention. The description is to be taken in conjunction with the accompanying drawings, in which:

FIGURE 1 is a simplified perspective view of a turbofan aircraft propulsion engine which is partially broken away to show diagrammatically its compressor and certain structural portions of this invention as associated with the compressor;

FIGURE 3 is a diagrammatic illustration of the mechanical portion of a present embodiment of this invention;

FIGURE 4 is a wiring diagram which shows the basic control circuitry used in the invention; and FIGURE 5 is a wiring diagram of the electrical portion of the present embodiment of this invention.

Description of the present embodiment

Figure 2:
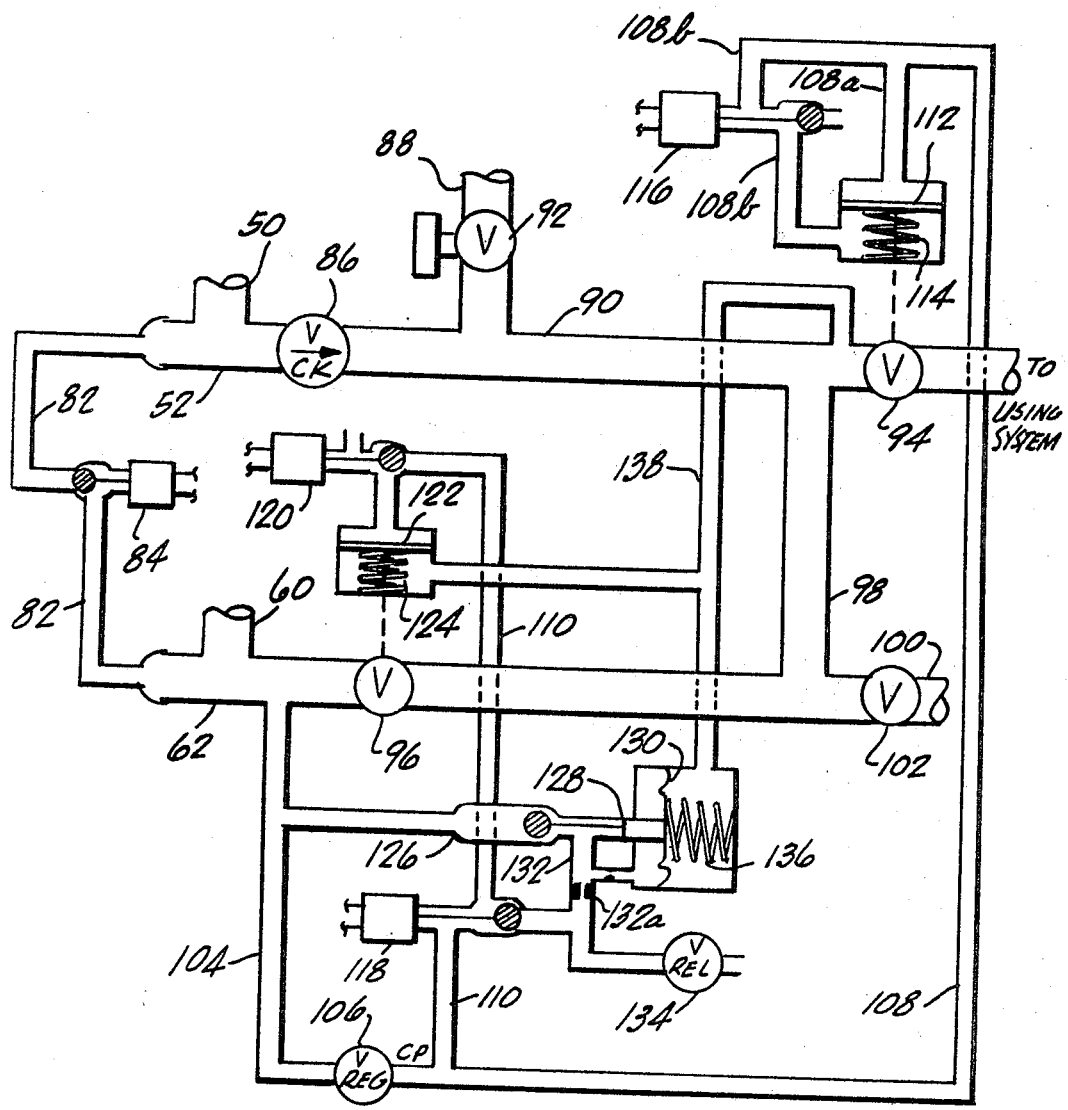
FIGURE 2 is a block diagram of the invention.

FIGURE 1 generally shows a perspective view of a turbofan aircraft propulsion engine 10. The view has been simplified and partially broken away to illustrate diagrammatically some of the internal components of the turbofan engine 10. The engine 10 is shown with its nacelle 12 fully opened and its thrust reverses 14 in the reverse thrust position. Nose cowl 16 is attached to engine inlet structure 18 which has inlet bullet 20 secured as shown to its hub 22. Located aft of the inlet structure 18 is fan 24 which has its rotor 26 driven by the fan turbine (located in the aft end of the engine 10 and not visibly shown here) through fan drive shaft 28.

Compressor 30 has its rotor 32 driven by the compressor turbine (located in the aft end of the engine 10 forward of the fan turbine and also not visibly shown here) through compressor drive shaft 34. The fan rotor 26 and its drive shaft 28 are hatched differently from that of the compressor rotor 32 and its drive shaft 34 for clarity of illustration. The compressor casing 36 mounts the stator blades 38 and forms fan air duct 40 with the outer engine casing 42. Aft of the compressor 30 are located combustion chambers 44 arranged concentrically about the compressor drive shaft 34. The compressor 30 is, for example, a 13-stage split compressor wherein the forward or low pressure section has six stages of compression and the aft or high pressure section has seven stages of compression. These stages are, of course, not fully depicted in the simplified and diagrammatic view of FIGURE 1.

In a 13- stage compressor, for example, a lower stage bleed air point is commonly located at the eighth stage of compression. The bleed air port or opening 46 can be a small axial gap which extends circumferentially around the compressor casing 36 as indicated in FIGURE 1. The opening 46 connects with interstage collector cavity 48 which, in turn, connects with ducting 50 that joins with peripheral bleed air manifold 52. Clean, higher pressure bleed air is obtained through a series of openings 54 located at, for example, the thirteenth stage at a point other than adjacent the compressor casing 36 as was done in the eighth stage. The openings 54 can be located in respective radial struts or the like having passageways 56 connecting with another collector cavity 58 which, in turn, connects with ducting 60 that joins with high pressure bleed air manifold 62.

By far the largest portions of contaminants (dirt particles) enter the fan 26 and pass through to the compressor 30 while the ariplane (not shown) which mounts the engine 10 is on the ground and when the engine 10 is operated with reverse thrust. Thus, if the dirt particles which are concentrated in a thin layer traveling axially along the compressor casing 36 can be prevented from entering the lower stage bleed air opening 46 during this critical period, the major portion of contaminants will be eliminated from the bleed air being supplied to the various air using systems.

FIGURE 2 is a block diagram which basically illustrates the invention. During normal operation, peripheral bleed air source 64 supplies compressed air through ducting 66, check valve means 68, ducting 70 and flow control valve means 72 to an air using system. Purge valve means 74 is closed and valve means regulator 76 controls valve means 78 to a closed condition which prevents air flow from the higher pressure bleed air source 80. When a period occurs in which a substantial amount of contaminants enters the compressor that includes the pheripheral air source 64 and the higher pressure air source 80, control signals are applied respectively to the flow control valve means 72, the purge valve means 74 and the regulator 76 controlling valve means 78.

The control signal to the flow control valve means 72 causes it to close thus shutting off the air using system connected thereto. The control signal to the regulator 76 changes its regulation to a mode which causes the valve means 78 to provide air from the source 80 to ducting 70 such that the pressure therein as sensed through line 70a is always higher than that of the peripheral air source 64. This, of course, assures that the check valve means 68 will remain closed during the period when a large amount of contaminants enters the compressor. Finally, the control signal to the purge valve means 74 causes it to open and a relatively small flow of higher pressure bleed air from source 80 is fed into the ducting 66, preventing any inflow of air with its contaminants from the source 64. Only a slight flow of higher pressure bleed air takes place into the ducting 66 from the higher pressure air source 80 through the purge valve means 72 since a relatively large pressure drop occurs across the structure of the purge valve means 74. At the end of this period, the control signals provided respectively to the flow control valve means 72, purge valve means 74 and regulator 76 are removed so that these components will be returned to normal operation.

FIGURE 3 diagrammatically illustrates the mechanical portion of a present embodiment of this invention which is used in connection with the aircraft jet engine 10 shown in FIGURE 1. Ducting 50 is fragmentarily shown in FIGURE 3 connecting with peripheral bleed air manifold 52. Similarly, ducting 60 is also fragmentarily shown connecting with high pressure bleed air manifold 62. The ends of the manifolds 52 and 62 are connected together by a smaller line 82 which is normally closed by an electrically controlled purge valve 84. The purge valve 84 corresponds, of course, to the purge valve means 74 indicated in FIGURE 2 and the manifold 52 corresponds generally to the ducting 66 thereof. When the purge valve 84 is opened, a relatively small flow of clean high pressure air from the manifold 62 is fed into manifold 52 which is then raised in pressure to prevent any inflow of air carrying contaminants from the ducting 50.

A check valve 86, corresponding to the check valve means 68 of FIGURE 2, is provided in the manifold 52 to which are connected engine starter ducting 88 and air conditioning ducting 90. Engine starter valve 92 is provided in the ducting 88 and an air conditioning system has been illustratively indicated here as the air using system. A control valve 94 is provided in the ducting 90 and normally allows air to flow to the air conditioning system (not shown). The control valve 94 corresponds generally to the flow control valve means 72 in FIGURE 2. Actually, other control valves and means are required for complete control of the air conditioning system; however, these other parts are not necessary for an understanding of this invention and have been omitted from the description for clarity of explanation.

Valve 96 is provided in the manifold 62 and corresponds to the valve means 78 of FIGURE 2. Ducting 98 connects the manifold 62 to the air conditioning ducting 90. Another ducting 100 leads to other air using systems including the ice protection system of the airplane, for example. A crossfeed shutoff valve 102 is provided in the ducting 100 and may be manually operated. The system shown in FIGURE 3 is that associated with, for example, the left engine of an airplane. The system for the right engine would of course, be substantially identical to that illustrated. The crossfeed valve 102 merely ties the two systems together as desired, and can be considered to be closed for ease of understanding this invention. The valve 102 is immaterial to the invention and has no direct bearing on it.

A line 104 connects the high pressure bleed air manifold 62 to a pressure regulator valve 106 which provides a constant pressure output to lines 108 and 110. The line 108 provides constant pressure to both sides of a piston 112 which is mechanically linked to control valve 94 and biased by spring 114 such that the valve 94 is normally held open thereby. The connection line 108a provides pressure to the upper side of the piston 112, and connection line 108b provides pressure to the lower side of the piston 112 by way of the electrically controlled valve 116 when it is not energized as indicated in FIGURE 3. When the valve 116 is energized, the connection line 108b is closed on one side of the valve 116 and opened to atmosphere on the other side. Thus, pressure in the connection line 108a operates the piston 112 and closes the control valve 94. This closes off the air conditioning system connected to the ducting 90.

The line 110 is connected through electrically controlled valve 118, when the valve 118 is not energized, to another electrically controlled valve 120. The line 110 is closed at the valve 120 when the latter is not energized. However, when the valve 120 is energized, as for normal air conditioning operation, pressure is provided through line 110 and valve 120 to the upper side of piston 122 which is mechanically linked to the valve 96. This, generally, opens the valve 96 which is normally held closed by the bias of spring 124 and any pressure on the lower side of the piston 122. When the valve 120 is not energized, the upper side of the piston 122 is connected to atmosphere through the valve 120 such that the valve 96 will be closed.

The line 104 from the manifold 62 also connects with line 126 which provides high pressure air to line 132 through regulator or modulating valve 128 controlled by diaphragm 130. The line 132 provides pressure to the underside or left side of diaphragm 130 and through line restrictor 132a to relief valve 134. The diaphragm 130 is biased by spring 136 on the side opposite that to which the pressure in line 132 is applied, and the relief valve 134 is set to discharge at a predetermined pressure such that a pressure which is no greater than this predetermined pressure exists in the line 132. The pressure in line 132 is operatively a few pounds per square inch higher than the existing pressure on the right side of diaphragm 130 but is, of course, limited to a maximum pressure which is established by the relief valve 134 setting. When the electrically controlled valves 118 and 120 are energized, it is apparent that the pressure in line 132 will be directed through the operated valve 118, the upper portion of connecting line 110 and the operated valve 120 to the upper side of the piston 122 which actuates the valve 96.

A line 138 connects air pressure from the air conditioning ducting 90 against the diaphragm 130 in opposition to the pressure provided by line 132 on the diaphragm 130. This line 138 is also connected to provide air pressure from the ducting 90 to the lower side of the piston 122 as shown in FIGURE 3. Thus, when the electrically controlled valves 116, 118 and 120 are energized, the control valve 94 is closed, and the pressure in line 132 operates the piston 122 and causes the valve 96 to open to the extent in accordance with the pressure differential existing across the piston 122. This feeds high pressure air through the valve 96 and ducting 98 into the ducting 90 upstream of the closed control valve 94.

As the pressure builds up in the closed portion of ducting 90, this pressure is also provided through the line 138 to the lower side of piston 122 and on the right side of the diaphragm 130 as shown in FIGURE 3. Diaphragm 130 controls the valve 128 and permits the pressure in line 132 to increase with that on the right side of the diaphragm 130. The result is that when the pressure in the line 138 causes the pressure in line 132 to reach the relief valve 134 setting, flow through restrictor 132a permits relief valve 134 to stabilize the pressure provided through the energized valves 118 and 120 to the upper side of piston 122. This action, combined with the pressure built up previously in the closed portion of ducting 90 and line 138 appearing on the lower side of the piston 122, quickly causes the valve 96 to close a corresponding amount to reduce the volume of high pressure air supplied through the valve 96. The overall net effect is a modulating action of the valve 96 which maintains the pressure in the closed portion of the air conditioning duct 90 at a predetermined pressure that is always higher than that in the peripheral bleed air manifold 52 and its associated compressor stage. This higher pressure prevents any flow from manifold 52 through check valve 86.

FIGURE 4 shows, in basic form, the control circuitry normally used with this invention. A relay 140 has its control coil 140a connected to +28 volts on one end and to ground on the other end through a control switch 142. The power (+28 volts) is also connected to relay poles 140b, 140c and 140d, and their respective contacts 140e, 140f and 140g provide control signals when the relay 140 is actuated, to operate in FIGURE 2 the valve means regulator 76, the purge valve means 74 and the flow control valve means 72 which closes off the air using system.

The switch 142 is closed at the beginning of a period during which particularly large amounts of contaminants enter the inlet of the compressor associated with the invention. When the relay coil 140a is energized, the poles 140b, 140c and 140d engage their respective contacts 140e, 140f and 140g to put this invention into operation as described above. The switch 142 is, of course, opened at the end of the period. It is noted that where relatively short distances and/or amounts of power are involved and distributed to the different control elements, relay control may be dispensed with since a manual switch connecting power to all of the elements can obviously be used.

FIGURE 5 is a wiring diagram of the electrical circuit which can be used with the apparatus shown in FIGURE 3. A control relay 144 which is similar to, and corresponds with, the relay 140 of FIGURE 4 is used to operate purge valve 84 and the control valves 116, 118 and 120 of FIGURE 3. One end of the relay coil 144a is connected to +28 volts and the other end is connected to ground through a switch 146. This switch 146 can be suitably mounted in a location so that it is closed when the throttle lever (not shown) for the left engine is placed in the reverse thrust position. When this occurs, the relay poles 144b, 144c, 144d and 144e are actuated to engage their respective contacts 144f, 144g, 144h and 144i.

The relay pole 144d connects +28 volts to the contact 144h, and this voltage is applied to the purge valve 84 when switch 148 is closed. The switch 148 is preferably a switch mechanically mounted relative to an oleo strut (not shown) of the associated aircraft's nose wheel such that when the weight of the aircraft is on the strut, the switch 148 is then closed. This prevents the purge valve 84 from being energized and opened except when the associated aircraft is on the ground with its engines operating in reverse thrust.

The relay pole 144b similarly connects +28 volts to the contact 144f, and this voltage is applied to the control valve 120. The relay poles 144c and 144e are both connected to ground when engaging their respective contacts 144g and 144i. Thus, when the relay coil 144a is energized, the control valves 116 and 118 are effectively energized by +28 volts applied through completed circuits. The valve 116 causes the control valve 94 (FIGURE 3) to close off the air conditioning ducting 90, and the valve 118 cuts off the pressure from the constant pressure regulator 106 and connects line 132 to the upper side of piston 122 through the concurrently energized control valve 120.

Another relay 150 is provided to control circuitry (not shown) identical to that illustrated for the relay 144. The control coil 150a is connected to +28 volts on one end, and to ground through switch 152 on the other end. The switch 152 is, of course, similar to the switch 146 and is closed when the throttle lever (not shown) for the right engine is placed in the reverse thrust position. The circuitry controlled by the relay 150 connects with apparatus duplicating that shown in FIGURE 3.

This completes the description of an illustrative embodiment of my invention. While a particular embodiment of the invention has been described above and shown in the drawings, it is to be understood that the described embodiment is merely illustrative of and not restrictive on my broad invention, and that various changes in design, structure and arrangement may be made in the disclosed embodiment of the invention without departing from the true spirit of my invention.

I claim:

1. In a multiple stage rotary compressor and a system for us ing bleed air tapped from said compressor, the method comprising the steps of:
    tapping air from said compressor at a first point relatively near the outer periphery of the rotor blades of the associated stage of said compressor, and normally feeding said air tapped from said first point to said system, and thereafter on demand, tapping air from said compressor at a second point downstream of said first point and radially closer adequately to the rotor body of said compressor than said first point, said air tapped from said second point being relatively cleaner and at a higher pressure than said air tapped from said first point, and feeding said air tapped from said second point to said system while simultaneously terminating the flow of said air tapped from said first point to said system.

2. The invention as defined in claim 1 including the step of closing off said system from the flow of said air tapped from said second point concurrently with the termination of said flow of said air tapped from said first point to said system.

3. In a multiple stage rotary compressor including a lower pressure source of peripheral bleed air, and a system for using said peripheral bleed air from said lower pressure source, the improvement comprising:

a higher pressure source of air which is relatively cleaner and at a higher pressure than said peripheral bleed air;

purge valve means operable to connect the output of said higher pressure source to the output of said lower pressure source, for discharging said relatively cleaner air to the output of said lower pressure source and preventing discharge of said peripheral bleed air therefrom; and means for operating said purge valve means, said operating means being operated on demand whereby said peripheral bleed air is prevented from discharging from the output of said lower pressure source to said air using system whenever said peripheral bleed air includes large amount of contaminants.

4. The invention as defined in claim 3 wherein said lower pressure source includes a first tap point located a lower compressor stage, and said higher pressure source relatively near the outer periphery of the rotor blades in includes a second tap point located radially closed adequately to the rotor body in a higher compressor stage having a pressure higher than that of said lower compressor stage.

5. The invention as defined in claim 3 including flow control valve means adapted to connect the output of said lower pressure source to said air using system and operable to close off said air using system, and means for operating said flow control valve means on demand whenever said peripheral bleed air includes large amounts of contaminants.

6. The invention as defined in claim 5 including check valve means connecting the output of said lower pressure source to said flow control valve means, regulated valve means connecting the output of said higher pressure source to a point between said check valve means and said flow control valve means and operable to maintain the pressure downstream of said check valve means higher than that upstream thereof at the output of said lower pressure source, and means for operating said regulated valve means on demand whenever said peripheral bleed air includes large amounts of contaminants.

References Cited
UNITED STATES PATENTS

| | | |
|---|---|---|
| 2,856,957 | 10/1958 | McDowell et al. |
| 2,863,288 | 12/1958 | Martin. |
| 2,956,585 | 10/1960 | Alsworth et al. |
| 3,031,132 | 4/1962 | Davies. |

FOREIGN PATENTS

| | | |
|---|---|---|
| 1,090,733 | 10/1954 | France. |

CARLTON R. CROYLE, *Primary Examiner.*

U.S. Cl. X.R.

60—39.07, 39.18, 230, 269